United States Patent
Tsujikawa et al.

(10) Patent No.: US 9,515,353 B2
(45) Date of Patent: Dec. 6, 2016

(54) NON-AQUEOUS ELECTROLYTE BATTERY

(75) Inventors: Tomonobu Tsujikawa, Tokyo (JP); Masayasu Arakawa, Tokyo (JP); Kenji Kurita, Tokyo (JP); Masayuki Terada, Tokyo (JP)

(73) Assignees: NTT FACILITIES, INC., Tokyo (JP); HITACHI CHEMICAL COMPANY, LTD., Tokyo (JP)

( * ) Notice: Subject to any disclaimer, the term of this patent is extended or adjusted under 35 U.S.C. 154(b) by 456 days.

(21) Appl. No.: 13/820,817

(22) PCT Filed: Sep. 5, 2011

(86) PCT No.: PCT/JP2011/070122
§ 371 (c)(1),
(2), (4) Date: May 7, 2013

(87) PCT Pub. No.: WO2012/033034
PCT Pub. Date: Mar. 15, 2012

(65) Prior Publication Data
US 2013/0252090 A1    Sep. 26, 2013

(30) Foreign Application Priority Data
Sep. 6, 2010 (JP) .................................. 2010-198752

(51) Int. Cl.
*H01M 10/42* (2006.01)
*H01M 4/587* (2010.01)
(Continued)

(52) U.S. Cl.
CPC ......... *H01M 10/4235* (2013.01); *H01M 4/587* (2013.01); *H01M 4/661* (2013.01); *H01M 10/0525* (2013.01); *Y02E 60/122* (2013.01)

(58) Field of Classification Search
None
See application file for complete search history.

(56) References Cited

U.S. PATENT DOCUMENTS 5,332,631 A * 7/1994 Abraham et al. ................ 429/48
2001/0008725 A1 * 7/2001 Howard .......................... 429/94
(Continued)

FOREIGN PATENT DOCUMENTS

CN    1524313 A    8/2004
EP    2405519 A1   1/2012
(Continued)

OTHER PUBLICATIONS

Fei et al. Journal of Power Sources 195 (2010) 2082-2088.*
(Continued)

*Primary Examiner* — Carlos Barcena
*Assistant Examiner* — Wojciech Haske
(74) *Attorney, Agent, or Firm* — Fitch, Even, Tabin & Flannery, LLP

(57) ABSTRACT

A non-aqueous electrolyte, lithium-ion secondary battery includes an electrode group in which positive and negative electrode plates are wound via a separator accommodated into a battery container into which a non-aqueous electrolyte is injected. In the positive electrode plate, a positive electrode mixture layer including a lithium transition metal complex oxide is formed at both surfaces of an aluminum foil. A flame retardant layer containing a phosphazene compound as a flame retardant and a polyethylene oxide of a binder having ionic conductivity is formed at a surface of the positive electrode mixture layer. In the negative electrode plate, a negative electrode mixture layer including a carbon material of a negative electrode active material is formed at both surfaces of rolled copper foil. Ionic conductivity is secured by the polyethylene oxide, and the phosphazene compound decomposes when a battery temperature rises due to battery abnormality.

6 Claims, 1 Drawing Sheet

(51) Int. Cl.
*H01M 4/66* (2006.01)
*H01M 10/0525* (2010.01)

(56) References Cited

U.S. PATENT DOCUMENTS

| | | | |
|---|---|---|---|
| 2003/0059675 A1* | 3/2003 | Sasaki et al. | 429/128 |
| 2003/0072996 A1 | 4/2003 | Roh | |
| 2008/0153005 A1* | 6/2008 | Horikawa et al. | 429/314 |

FOREIGN PATENT DOCUMENTS

| | | |
|---|---|---|
| JP | 4-184870 | 7/1992 |
| JP | 6-53535 | 2/1994 |
| JP | 6-168739 | 6/1994 |
| JP | 2000-173619 | 6/2000 |
| JP | 2003-272635 | 9/2003 |
| JP | 2006-127839 | 5/2006 |
| JP | 2006-127839 A | 5/2006 |
| JP | 2007-035391 | 2/2007 |
| JP | 2009-16106 | 1/2009 |
| JP | 2010-50075 | 3/2010 |
| WO | 03/005479 A1 | 1/2003 |

OTHER PUBLICATIONS

Guglielmi et al. Appl. Organometal. Chem. 13 (1999) 339-351.*
Office Action of CN Appln. No. 201180042815.0 dated Feb. 3, 2015 with English translation.
Office Action of CN Appln. No. 201180042815.0 dated Oct. 21, 2015 with English translation.
Search Report of EP Appln. No. 11823509.2 dated Jun. 16, 2014 in English.

* cited by examiner

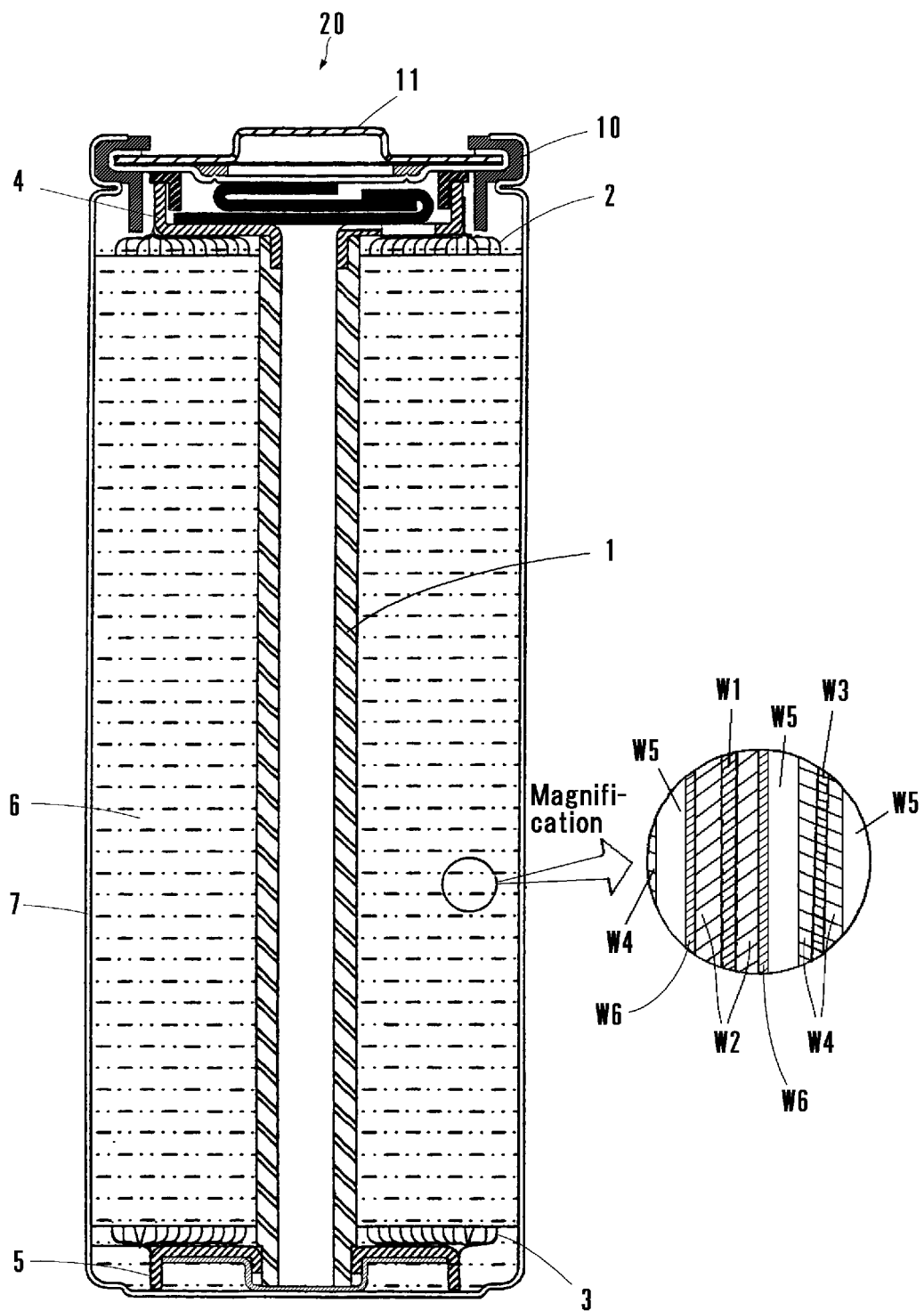

NON-AQUEOUS ELECTROLYTE BATTERY

FIELD OF THE INVENTION

The present invention relates to a non-aqueous electrolyte battery, and more particularly to a non-aqueous electrolyte battery that a positive electrode plate in which a positive electrode mixture including a positive electrode active material is applied to a collector and a negative electrode plate in which a negative electrode mixture including a negative electrode active material is applied to a collector are disposed via a porous separator.

DESCRIPTION OF RELATED ART

As a secondary battery of which electrolyte is an aqueous solution, an alkaline battery, a lead battery or the like is known. In place of such an aqueous solution secondary battery, as a secondary battery which is small, light-weighted and has high energy density, a non-aqueous electrolyte battery represented by a lithium secondary battery is being widely used. An organic solvent such as dimethyl ether or the like is included in an electrolyte used for the non-aqueous electrolyte battery. Because the organic solvent has a property of inflammability, in a case that the battery falls into an abnormal state such as shortcut and the like or that a battery temperature goes up when it is thrown into fire, behavior of the battery may become violent due to burning of a battery constituting material or a thermal decomposition reaction of an active material.

In order to avoid such a situation to secure safety of the battery, various safety techniques have been proposed. For example, a technique for making a battery non-flammable by dissolving a flame retardant (non-flammability giving material) into a non-aqueous electrolyte (see JPA 04-184870), and a technique for making a separator non-flammable by dispersing a flame retardant into the separator (see JPA 2006-127839) are disclosed.

SUMMARY OF THE INVENTION

Problem to be Solved by the Invention

However, the techniques disclosed in JPA 04-184870 and JPA 2006-127839 are techniques for making a battery constituting material such as the non-aqueous electrolyte or separator which contains the flame retardant non-flammable, and accordingly it is difficult to make the battery itself non-flammable. For example, in the technique disclosed in JPA 2006-127839, the separator itself can obtain non-flammability according to an amount of the flame retardant contained in the separator. In a case that this technique is applied to the lithium secondary battery, because heat generation becomes large due to a thermal decomposition reaction of an active material in the lithium secondary battery, a large amount of the flame retardant becomes necessary in order to restrict an increase in a battery temperature. In this way, in the separator in which the large amount of the flame retardant is contained, it may cause a drawback in that it is difficult for retaining strength originally required as a separator. Further, the flame retardant may be contained in the mixture together with the active material, however, in this case, it may cause a drawback in that, because a space formed in a mixture layer is filled up by the flame retardant, the movement of ions at a time of charging/discharging is hampered, and accordingly the capacity or output of the battery drops.

In view of the above circumstances, the present invention is to provide a non-aqueous electrolyte battery capable of securing safety at a time of battery abnormality and restricting a drop in capacity or output at a time of battery use.

Means for Solving the Problem

In order to solve the above problem, the present invention is directed to a non-aqueous electrolyte battery that a positive electrode plate in which a positive electrode mixture including a positive electrode active material is applied to a collector and a negative electrode plate in which a negative electrode mixture including a negative electrode active material is applied to a collector are disposed via a porous separator, wherein a flame retardant layer containing a phosphazene compound of a flame retardant and a binder having ionic conductivity is placed at one side or both sides of at least one kind of the positive electrode plate, the negative electrode plate and the separator.

In the present invention, since the flame retardant exists near the active material due to that the phosphazene compound of a flame retardant is contained in the flame retardant layer which is placed at one side or both sides of at least one kind of the positive electrode plate, the negative electrode plate and the separator, burning of the battery is restricted according to the flame retardant when a temperature goes up due to battery abnormality, and accordingly behavior of the battery can be made calm to secure safety; and since ionic conductivity is secured at the flame retardant layer at a time of normal charge/discharge due to that the binder contained in the flame retardant layer has ionic conductivity, a drop in the capacity or output can be restricted.

In this case, the flame retardant may decompose thermally under a thermal environment of from 60 deg. C. to 400 deg. C. The flame retardant may be contained at a percentage of 10 wt % or more to the positive electrode mixture. Further, the binder may be a polyether-based polymer compound. The polyether-based polymer compound may include a polyethylene oxide. Furthermore, the flame retardant layer may contain the flame retardant at a percentage of ranging from 50 wt % to 91 wt % and the binder at a percentage of ranging from 9 wt % to 50 wt %, respectively.

Effects of the Invention

According to the present invention, effects can be obtained that since the flame retardant exists near the active material due to that the phosphazene compound of a flame retardant is contained in the flame retardant layer which is placed at one side or both sides of at least one kind of the positive electrode plate, the negative electrode plate and the separator, burning of the battery is restricted according to the flame retardant when a temperature goes up due to battery abnormality, and accordingly behavior of the battery can be made calm to secure safety; and since ionic conductivity is secured at the flame retardant layer at a time of normal charge/discharge due to that the binder contained in the flame retardant layer has ionic conductivity, a drop in capacity and output can be restricted.

BRIEF DESCRIPTION OF THE DRAWING

FIG. 1 is a sectional view of a cylindrical lithium-ion secondary battery of an embodiment to which the present invention is applicable.

DETAILED DESCRIPTION OF THE PREFERRED EMBODIMENTS

With reference to the drawing, an embodiment in which the present invention is applied to a cylindrical lithium-ion secondary battery (non-aqueous electrolyte battery) mounted for a hybrid vehicle will be explained below.

As shown in FIG. 1, a cylindrical lithium-ion secondary battery 20 of this embodiment has a cylindrical battery container 7 made of nickel plated steel and having a bottom. An electrode group 6 which is formed by winding a strip-shaped positive electrode plate and a strip-shaped negative electrode plate spirally in a cross-section via a separator is accommodated in the battery container 7.

A hallow cylindrical rod core 1 made of polypropylene is used at a winding center of the electrode group 6. A positive electrode collecting ring 4 which is a ring-shaped conductor and for collecting electric potential from the positive electrode plate is disposed at an upper side of the electrode group 6 approximately on an extension line of the rod core 1. The positive electrode collecting ring 4 is fixed to an upper end portion of the rod core 1. Each end portion of positive electrode lead pieces 2 led from the positive electrode plate is welded by ultrasonic welding to a peripheral face of a flange portion extended integrally from a periphery of the positive electrode collecting ring 4. A disc-shaped battery lid 11 which houses a safety valve and which functions as a positive electrode external terminal is disposed at an upper side of the positive electrode collecting ring 4. An upper portion of the positive electrode collecting ring 4 is connected to the battery lid 11 via a conductive lead.

On the other hand, a negative electrode collecting ring 5 which is a ring-shaped conductor and for collecting electric potential from the negative electrode plate is disposed at a lower side of the electrode group 6. An outer circumference of a lower end of the rod core 1 is fixed to an inner circumference of the negative electrode collecting ring 5. Each end portion of negative electrode lead pieces 3 led from the negative electrode plate is welded to an outer periphery of the negative electrode collecting ring 5. A lower side of the negative electrode collecting ring 5 is connected to an inner bottom portion of the battery container 7 via a conductive lead. In this embodiment, an outer diameter of the battery container 7 is set to 40 mm and an inner diameter thereof is set to 39 mm.

The battery lid 11 is fixed by performing caulking via a gasket 10 made of EPDM having insulation and heat resisting properties at an upper portion of the battery container 7. For this reason, an interior of the lithium-ion secondary battery 20 is sealed. Further, a non-aqueous electrolyte (electrolytic solution) is injected to the battery container 7. Lithium hexafluorophosphate ($LiPF_6$) as a lithium salt, added at 1 mole/liter to a mixed solvent of ethylene carbonate (EC), dimethyl carbonate (DMC) and diethyl carbonate (DEC) mixed at a volume ratio of 1:1:1, is used for the non-aqueous electrolyte. Incidentally, the lithium-ion secondary battery 20 is given a function as a battery by carrying out initial charge with a predetermined voltage and current.

The electrode group 6 is made in a manner that the positive electrode plate and the negative electrode plate are wound together via a polyethylene-made separator W5 through which lithium-ions can pass around the rod core 1 such that the both electrode plates do not come in direct contact with each other. In this embodiment, a thickness of each of the separators W5 is set to 30 μm. The positive electrode lead pieces 2 and the negative electrode lead pieces 3 are respectively positioned at both end faces opposed to each other with respect to the electrode group 6. In this embodiment, the lengths of the positive electrode plate, the negative electrode plate and the separator W5 are adjusted in order to set a diameter of the electrode group 6 to 38±0.5 mm. Insulating covering or coating is applied to the entire circumference of the electrode group 6 and the peripheral face of the flange portion of the positive electrode collecting ring 4 in order to prevent electric contact between the electrode group 6 and the battery container 7. An adhesive tape having a base member made of polyimide and adhesive agent made of hexameta-acrylate applied to one surface thereof is used for the insulating covering. The adhesive tape is wound at least one time from a peripheral surface of the flange portion to an outer peripheral surface of the electrode group 6. The winding number is adjusted so that a maximum diameter portion of the electrode group 6 is set as an insulating covering existence portion, and the maximum diameter is set to be slightly smaller than the inner diameter of the battery container 7.

The positive electrode plate constituting the electrode group 6 has an aluminum foil (collector) W1 as a positive electrode collector. In this embodiment, a thickness of the aluminum foil W1 is set to 20 μm. A positive electrode mixture is applied to both surfaces of the aluminum foil W1 approximately uniformly and homogeneously to form a positive electrode mixture layer W2. A lithium transition metal complex oxide as a positive electrode active material is included in the positive electrode mixture. A thickness of the applied positive electrode mixture layer W2 is approximately uniform and the positive electrode active material is dispersed in the positive electrode mixture layer W2 approximately uniformly. In this embodiment, either lithium manganese nickel cobalt complex oxide powder having a layered crystal structure or lithium manganate powder having a spinel crystal structure is used for the lithium transition metal complex oxide. For example, 8 wt % of scale-shaped graphite and 2 wt % of acetylene black as a conductive material, and 5 wt % of polyvinylidene fluoride (hereinafter abbreviated as PVdF) as a binder, to 85 wt % (weight parts) of the lithium transition metal complex oxide, are mixed in the positive electrode mixture. N-methyl-2-pyrrolidone (hereinafter abbreviated as NMP) as a dispersion solvent is used for applying the positive electrode mixture to the aluminum foil W1. A non-applied portion of the positive electrode mixture, with a width of 30 mm, is formed at one side edge along a longitudinal direction of the aluminum foil W1. The non-applied portion is notched like a comb, and the positive electrode lead pieces 2 are formed by notched remaining portions thereof. A distance or an interval between the adjacent positive electrode lead pieces 2 is set to 20 mm and a width of each of positive electrode lead pieces 2 is set to 5 mm. The positive electrode plate, after drying, is pressed and then cut to have a width of 80 mm.

Further, a flame retardant layer W6 containing a flame retardant and a binder having ionic conductivity is formed at a surface of the positive electrode mixture layer W2, namely, at both surfaces of the positive electrode plate. A phosphazene compound of which main constituents are phosphorus and nitrogen is used for the flame retardant. As the binder, a polyether-based polymer compound having ionic conductivity can be used, and, for example, a polyethylene oxide, polyethylene glycol dimethyl ether, polyethylene glycol methyl ether and the like may be listed. In this embodiment, a polyethylene oxide is used for the binder. In this embodiment, a mixing percentage of the flame retardant is set to 1 wt % or more to the positive electrode mixture. Further, a mixing percentage of the binder may be set in a range of 1 to 10 wt % to the positive electrode mixture. The flame retardant layer W6 contains the phosphazene compound at a percentage of ranging from 50 wt % to 91 wt % and the polyethylene oxide at a percentage of ranging from 9 wt % to 50 wt %, respectively. This flame retardant layer W6 is formed as follows. Namely, a solution into which the phosphazene compound and the polyethylene oxide are dissolved and dispersed is applied to the surface of the positive electrode mixture layer W2, and then the positive electrode plate, after drying, is pressed in order to adjust a thickness thereof as a whole.

The phosphazene compound is a cyclic compound expressed by a general formula of $(NPR_2)_3$ or $(NPR_2)_4$. R in the general formula expresses halogen such as fluorine, chlorine and the like or univalent substituent. As the univalent substituent, alkoxy group such as methoxy group, ethoxy group and the like, aryloxyl group such as phenoxy group, methylphenoxy group and the like, alkyl group such as methyl group, ethyl group and the like, aryl group such as phenyl group, tolyl group and the like, amino group including substitutional amino group such as methylamino group and the like, alkylthio group such as methylthio group, ethylthio group and the like, and arylthio group such as phenylthio group and the like may be listed. These phosphazene compounds decompose thermally at a predetermined temperature respectively, however, the phosphazene compound which decomposes thermally under a thermal environment of from 60 deg. C. to 400 deg. C. is used. Namely, considering that the positive electrode active material begins self-heating at 60 deg. C. or more and begins thermal decomposition at a temperature of exceeding 400 deg. C., the phosphazene compound which decomposes thermally at a temperature of from 60 deg. C. to 400 deg. C. is used.

On the other hand, the negative electrode plate has a rolled copper foil (collector) W3 as a negative electrode collector. In this embodiment, a thickness of the rolled copper foil W3 is set to 10 μm. A negative electrode mixture is applied to both surfaces of the rolled copper foil W3 approximately uniformly and homogeneously in the same manner as the positive electrode plate. A carbon material served as a negative electrode active material in/from which lithium-ions can be occluded/released is included in the negative electrode mixture. In this embodiment, amorphous carbon power is used for the carbon material of the negative electrode active material. For example, 10 weight parts of PVdF as a binder is added, to 90 weight parts of the amorphous carbon powder, in the negative electrode mixture. NMP as a dispersion solvent is used for applying the negative electrode mixture to the rolled copper foil W3. Anon-applied portion of the negative electrode mixture, with a width of 30 mm, in the same manner as the positive electrode plate, is formed at one side edge along a longitudinal direction of the rolled copper foil W3 to form the negative electrode lead pieces 3. A distance between the adjacent negative electrode lead pieces 3 is set to 20 mm and a width of each of negative electrode lead pieces 3 is set to 5 mm. The negative electrode plate, after drying, is pressed and then cut to have a width of 86 mm. Incidentally, a length of the negative electrode plate is set, when the positive electrode plate and the negative electrode plate are wound, 120 mm longer than that of the positive electrode plate such that the positive electrode plate does not go beyond the negative electrode plate in a winding direction at innermost and outermost winding circumferences. Besides, a width of the negative electrode mixture layer W4 (applied portion of the electrode mixture) is set 6 mm longer than that of the positive electrode mixture layer W2 such that the positive electrode mixture layer W2 does not go beyond the negative electrode mixture layer W4 in a winding direction and a vertical direction.

EXAMPLES

Next, Examples of the lithium-ion secondary battery 20 manufactured according to the above embodiment will be explained. Incidentally, a lithium-ion secondary battery of Control (Comparative Example) manufactured for making a comparison with Examples will also be explained.

Example 1

In Example 1, a solution in which a phosphazene compound served as a flame retardant (made by BRIDGESTONE CORP., Product Name: Phoslight (Registered Trademark), solid body, decomposition temp.: 250 deg. C. or more) and a polyethylene oxide are dissolved/dispersed was produced. A mixing percentage of the polyethylene oxide was set to 1 wt % to the positive electrode mixture. A mixing percentage of the phosphazene compound was set, as shown in Table 1 below, to 1 wt % to the positive electrode mixture. This dispersed solution was applied to the surface of the positive electrode mixture layer W2 of which thickness is set to 120 μm according to press working. At this time, a mixing percentage of the flame retardant to the positive electrode mixture was adjusted by controlling an applying amount of the dispersed solution. A thickness of the flame retardant layer W6 was 4 μm. In the flame retardant layer W6, the phosphazene compound and the polyethylene oxide are contained at 50 wt % respectively.

TABLE 1

|  | Amount of Flame Retardant | Thickness of Flame Retardant Layer |
| --- | --- | --- |
| Example 1 | 1 wt % | 4 μm |
| Example 2 | 2 wt % | 8 μm |
| Example 3 | 3 wt % | 10 μm |
| Example 4 | 5 wt % | 17 μm |
| Example 5 | 6 wt % | 20 μm |
| Example 6 | 8 wt % | 24 μm |
| Example 7 | 10 wt % | 31 μm |
| Example 8 | 15 wt % | 44 μm |
| Example 9 | 20 wt % | 63 μm |

Example 2 to Example 9

As shown in Table 1, in Examples 2 to 9, the battery was manufactured in the same manner as Example 1 except a change in the mixing percentage of the flame retardant. Namely, the mixing percentage of the flame retardant was set to 2 wt % in Example 2, 3 wt % in Example 3, 5 wt % in Example 4, 6 wt % in Example 5, 8 wt % in Example 6, 10 wt % in Example 7, 15 wt % in Example 8 and 20 wt % in Example 9, respectively. Because the applying amount of the dispersed solution to the positive electrode mixture layer W2 was increased in order to make the mixing percentage of the flame retardant large, the obtained thickness of the flame retardant layer W6 in the positive electrode plate was changed. The thickness of the flame retardant layer W6 was, as shown in Table 1, 8 μm in Example 2, 10 μm in Example 3, 17 μm in Example 4, 20 μm in Example 5, 24 μm in Example 6, 31 μm in Example 7, 44 μm in Example 8 and 63 μm in Example 9, respectively. Incidentally, the percentage of the phosphazene compound and the polyethylene oxide contained in the flame retardant layer W6 was set to 50 wt % and 50 wt % respectively in each of Examples 2 to 9 because the same dispersed solution as Example 1 was used and the amount of the flame retardant was adjusted according to the applying amount.

(Control)

In Control, the battery was manufactured in the same manner as Example 1 except that the flame retardant layer W6 is not formed at the surface of the positive electrode mixture layer W2. Namely, the lithium-ion secondary battery of Control is a conventional battery.

(Test 1)

An overcharge test was carried out for evaluation with respect to each of the lithium-ion secondary batteries of Examples and Control. In the overcharge test, a thermocouple was disposed at a center of each of the lithium-ion secondary batteries to measure a temperature at each surface of the batteries when the batteries were being overcharged at a current value of 0.5 C. Table 2 below shows the highest temperature of each surface of the batteries in the overcharge test.

TABLE 2

|  | Highest Temp. at Battery Surface |
| --- | --- |
| Example 1 | 461.0 deg. C. |
| Example 2 | 444.2 deg. C. |
| Example 3 | 419.1 deg. C. |
| Example 4 | 375.1 deg. C. |
| Example 5 | 348.8 deg. C. |
| Example 6 | 281.2 deg. C. |
| Example 7 | 121.4 deg. C. |
| Example 8 | 80.5 deg. C. |
| Example 9 | 77.3 deg. C. |
| Control | 482.9 deg. C. |

As shown in Table 2, in the lithium-ion secondary battery of Control in which the flame retardant was not contained, the highest temperature at the battery surface reached 482.9 deg. C. according to the overcharge test. While, it is understood, in the lithium-ion secondary batteries of Examples 1 to 9 in which the flame retardant was contained, that the highest temperature at each of the battery surfaces was lowered and that the lowering ratio of the highest temperature became large by making the mixing percentage of the flame retardant large. If the flame retardant is mixed at the mixing percentage of 1 wt % to the positive electrode mixture (Example 1), the lithium-ion secondary battery can lower the highest temperature at a battery surface thereof comparing with the lithium-ion secondary battery of Control. When a thermal decomposition reaction of the active material or a chain reaction thereof is considered, it is preferable that the highest temperature at the battery surface is controlled at approximately 150 deg. C. or less. This can be attained by setting the mixing percentage of the flame retardant to 10 wt % or more (Example 7 to Example 9).

Example 10

In Example 10, the flame retardant layer W6 was formed at the surface of the positive electrode layer W2 having a thickness of 120 μm in the same manner as Example 1 except that the mixing percentage of the phosphazene compound is set to 10 wt % to the positive electrode mixture and the mixing percentage of the polyethylene oxide is set to 1 wt % to the positive electrode mixture as shown in Table 3 below. The thickness of the flame retardant layer W6 was 25 μm. The flame retardant layer W6 contains the phosphazene compound at 91 wt % and the polyethylene oxide at 9 wt %, respectively.

TABLE 3

|  | Amount of Binder | Thickness of Flame Retardant Layer |
| --- | --- | --- |
| Example 10 | 1 wt % | 25 μm |
| Example 11 | 3 wt % | 24 μm |
| Example 12 | 5 wt % | 26 μm |
| Example 13 | 8 wt % | 28 μm |
| Example 14 | 10 wt % | 31 μm |
| Example 15 | 1 wt % | 32 μm |
| Example 16 | 1 wt % | 29 μm |

Example 11 to Example 14

As shown in Table 3, in Examples 11 to 14, the battery was manufactured in the same manner as Example 10 except a change in the mixing percentage of the polyethylene oxide. Namely, the mixing percentage of the polyethylene oxide was set to 3 wt % in Example 11, 5 wt % in Example 12, 8 wt % in Example 13 and 10 wt % in Example 14, respectively. The thickness of the flame retardant layer W6 was 24 μm in Example 11, 26 μm in Example 12, 28 μm in Example 13 and 31 μm in Example 14, respectively. The percentage of the phosphazene compound and the polyethylene oxide contained in the flame retardant layer W6 was set to 77 wt % and 23 wt % in Example 11, 67 wt % and 33 wt % in Example 12, 56 wt % and 44 wt % in Example 13, and 50 wt % and 50 wt % in Example 14, respectively.

Example 15 to Example 16

In Examples 15 and 16, the battery was manufactured in the same manner as Example 10 except a change in the binder contained in the flame retardant layer W6. Namely, as a binder, polyethylene glycol dimethyl ether was used in Example 15 and polyethylene glycol methyl ether was used in Example 16, respectively. As shown in Table 3, the thickness of the flame retardant layer W6 was 32 μm in Example 15 and 29 μm in Example 16.

(Test 2)

A charge/discharge test was carried out for evaluation with respect to the lithium-ion secondary batteries of Examples 10 to 16 and Control. In the charge/discharge test, after each of the lithium-ion secondary batteries was charged at a current value of 0.5 C, a discharge capacity was measured when each of the lithium-ion secondary batteries was discharged at a current value of 1.0 C and 3.0 C. Each relative capacity when the discharge capacity of the lithium-ion secondary battery of Control is defined by 100% was calculated. The results of the discharge capacity calculation were shown in Table 4 below.

TABLE 4

|  | 1.0 C Discharge | 3.0 C Discharge |
| --- | --- | --- |
| Example 10 | 92% | 83% |
| Example 11 | 95% | 86% |
| Example 12 | 96% | 85% |
| Example 13 | 94% | 84% |
| Example 14 | 93% | 82% |
| Example 15 | 88% | 74% |
| Example 16 | 83% | 72% |

As shown in Table 4, in each of the lithium-ion secondary batteries 20 of Examples 10 to 14 that the flame retardant layer W6 was formed at the surface of the positive electrode mixture layer W2, it was confirmed that the discharge capacity of 90% or more in 1.00 discharge and 80% or more in 3.00 discharge were secured in comparison with the lithium-ion secondary battery that the flame retardant layer W6 was not formed. A drop in battery performance was anticipated due to forming of the flame retardant layer W6, however, the drop in a capacity was restricted because the binder contained in the flame retardant layer W6 has ionic conductivity. A little drop in a capacity was observed in the batteries of Examples 15 and 16 in which a kind of the binder was changed comparing with the batteries that the polyethylene oxide was used as the binder, however, it was confirmed that the discharge capacity of 80% or more in 1.0 C discharge and 70% or more in 3.0 C discharge were secured.

(Effects and the Like)

Next, effects and the like of the lithium-ion secondary battery 20 according to this embodiment will be explained.

In this embodiment, the flame retardant layer W6 in which the phosphazene compound served as a flame retardant is contained is formed at the surface of the positive electrode mixture layer W2 of the positive electrode plate which constitutes the electrode group 6. This phosphazene compound decomposes at the predetermined temperature (60 to 400 deg. C.) under the high thermal environment such as the time of battery abnormality and the like. The phosphazene compound exists near the positive electrode active material because the flame retardant layer W6 is formed at the surface of the positive electrode mixture layer W2. For this reason, in a case that the lithium-ion secondary battery 20 is exposed to an abnormal high thermal environment or that it is fallen into battery abnormality, when the battery temperature goes up due to the thermal decomposition reaction of the positive electrode active material or a chain reaction thereof, the phosphazene compound decomposes. Thus, since the burning of a battery constituting material is restricted, it is possible to make battery behavior calm to secure safety of the lithium-ion secondary battery 20.

Further, in this embodiment, the polyethylene oxide served as a binder and having ionic conductivity is contained in the flame retardant layer W6. In a case that a layer constituted only by the flame retardant is formed at the surface of the positive electrode mixture layer W2, there is a possibility that the movement of lithium-ions is hampered because a space of the active material placed at the surface of the positive electrode mixture layer W2 is filled up by the flame retardant. This brings about a drop in output. By contrast, in the battery of this embodiment, because ionic conductivity is secured due to that the polyethylene oxide having ionic conductivity is contained in the flame retardant layer W6, lithium-ions can move sufficiently between the positive and negative electrode plates, and accordingly battery performance can be secured. Furthermore, in a case that the flame retardant layer W6 is constituted only by the phosphazene compound, a dispersing state of the phosphazene compound is apt to become heterogeneous, and accordingly securing safety may be insufficient. By contrast, by mixing the phosphazene compound and the binder to form the flame retardant layer W6, the dispersing state of the phosphazene compound becomes uniform, and accordingly stable fire resistance effects can be obtained. Besides, because the dispersing state of the phosphazene compound which impedes ionic conductivity originally becomes uniform, the polyethylene oxide existing at the space among the phosphazene compound forms an ionic conduction path which is disposed approximately uniformly to make the flame retardant layer porous. For this reason, the movement of lithium-ions becomes smooth, which can contribute to securing battery performance.

Furthermore, in this embodiment, the phosphazene compound which decomposes thermally under the thermal environment of 60 deg. C. or more and 400 deg. C. or less is used as a flame retardant. When it is considered that the lithium transition metal complex oxide served as a positive electrode active material begins self-heating at 60 deg. C. or more, there is a possibility that the phosphazene compound which decomposes thermally at below 60 deg. C. hampers normal charge/discharge performance. Further, the phosphazene compound which decomposes thermally at a temperature exceeding 400 deg. C. can hardly obtain the sufficient effects against fire resistance because the lithium transition metal complex oxide begins thermal decomposition at the temperature exceeding 400 deg. C. Accordingly, the phosphazene compound which decomposes thermally under a temperature of 60 deg. C. or more and 400 deg. C. or less can secure the battery performance of the lithium-ion secondary battery 20 because the phosphazene compound does not decompose to retain the flame retardant layer W6 at a time of normal battery use and can secure safety because the phosphazene compound decomposes at the temperature environment under which the battery falls into abnormality.

Incidentally, in this embodiment, an example that the flame retardant layer W6 is formed at the surface of the positive electrode mixture layer W2, namely, at the both surfaces of the positive electrode plate was shown, however, the present invention is not limited to this. For example, the flame retardant layer W6 may be formed at a surface of the negative electrode mixture layer W4 or the separator W5. That is, the flame retardant layer W6 may be formed at one surface or both surfaces of at least one of the positive electrode plate, the negative electrode plate and the separator W5. Even in a case that the flame retardant layer W6 is formed at the surface of the negative electrode mixture layer W4 or the separator W5, it was confirmed that the same effects as this embodiment can be obtained. It is effective to form the flame retardant layer W6 at the positive electrode plate because it is anticipated that a heating valve (calorific valve) becomes large at the positive electrode plate when the battery falls into abnormality.

Further, in this embodiment, an example of the polyethylene oxide was shown as the binder contained in the flame retardant layer W6, however, the present invention is not limited to the same. Any binder having ionic conductivity and capable of forming the flame retardant layer W6 may be used. As a material having binder function and lithium-ion conductivity, a polyether-based polymer compound may be listed, and the above stated polyethylene glycol dimethyl ether, polyethylene glycol methyl ether and the like may be used. Further, in this embodiment, an example that one kind of the polyethylene oxide is used for the binder is shown, however, two kinds or more may be used.

Furthermore, in this embodiment, an example that the percentage of the binder contained in the flame retardant layer W6 is set to a range of from 1 to 10 wt % to the positive electrode mixture was shown. In a case that the mixing percentage of the binder exceeds 10 wt %, there is a possibility to hamper battery performance because the thickness of the flame retardant layer W6 becomes large. Namely, in lithium-ion secondary batteries having the same volume, if the thickness of the flame retardant layer W6 becomes large, battery performance drops more because the thickness of the positive electrode mixture layer W2 becomes small relatively and thereby the amount of the active material decreases. To the contrary, in a case that the mixing percentage of the binder is less than 1 wt %, effects for restricting the drop in output or capacity cannot be obtained sufficiently because it is difficult to form the flame retardant layer W6 and ionic conductivity becomes insufficient.

Further, in this embodiment, an example that the percentage of the flame retardant contained in the flame retardant layer W6 is set to 1 wt % or more was shown (Examples 1 to 9). If the mixing percentage of the flame retardant is less than 1 wt %, it is difficult to restrict the temperature increase due to the thermal decomposition reaction. When restricting a further temperature increase due to the chain reaction of the thermal decomposition reaction is considered, it is preferable that the mixing percentage of the flame retardant is 10 wt % or more. To the contrary, it is not preferable in a case that the mixing percentage of the flame retardant exceeds 20 wt %, because the thickness of the flame retardant layer W6 increases, and which brings about a possibility of dropping in battery capacity due to a decrease in a filling amount of the active material into the battery and a possibility of an increase in a battery resistance due to a distance increase between the positive and negative electrode plates. Accordingly, it is preferable to set the mixing percentage of the flame retardant in the range of from 10 to 20 wt %.

Furthermore, in this embodiment, an example that one kind of the phosphazene compound as the binder was mixed, the present invention is not limited to this. Two kinds or more of the phosphazene compounds explained in this embodiment may be used, and the flame retardant other than the phosphazene compound may be mixed to the phosphazene compound. Such a flame retardant is required to decompose thermally in the above stated temperature range to restrict the thermal decomposition reaction of the active material and the temperature increase due to a chain reaction thereof.

Further, this embodiment did not refer to especially, however, the flame retardant layer W6 may be made porous so as to improve a property of lithium-ion permeability. In order to make the flame retardant layer W6 porous, a pore former (pore forming material) may be mixed when the flame retardant layer W6 is formed. As a pore former, for example, an aluminum oxide and the like can be used, and the mixing percentage of the pore former may be adjusted according to a ratio of pores to be formed. This improves a moving property of lithium-ions between the positive and negative electrode plates at a time of normal battery use (charge/discharge), and accordingly battery performance can be enhanced. Furthermore, the flame retardant layer W6 may contain a conductive material. In this case, because electron conductivity is improved in addition to the ionic conductivity in the flame retardant layer W6, battery performance is improved. As such a conductive material, for example, a carbon material such as graphite, amorphous carbon and the like may be listed.

Moreover, in this embodiment, an example of the cylindrical lithium-ion secondary battery 20 mounted for the hybrid vehicle was shown, however, the present invention is not confined to the same. The present invention may be applied to a large lithium-ion secondary battery having a battery capacity exceeding approximately 3 Ah. Further, in this embodiment, an example of the electrode group 6 that the positive electrode plate and the negative electrode plate are wound via the separator was shown, however, the present invention is not limited to this. For example, the present invention may be applied to an electrode group that rectangular positive and negative electrodes are layered. Furthermore, with respect to a battery shape, it goes without saying that a square shape or the like may be employed other than the cylindrical shape. Further, it goes without saying that the present invention is not limited to the lithium-ion secondary battery, and the present invention is applicable to a non-aqueous electrolyte battery using a non-aqueous electrolyte.

Further, in this embodiment, an example that either lithium manganese nickel cobalt complex oxide powder having the layered crystal structure or lithium manganate powder having the spinel crystal structure is used for the lithium transition metal complex oxide was shown, however, the positive electrode active material usable in the present invention may be a lithium transition metal complex oxide. Besides, in this embodiment, an example that the amorphous carbon was used for the negative electrode active material, however the present invention is not limited to this. A carbon material in/from which lithium-ions can be occluded/released can be used, and for example, a graphite-based material may be used for the negative electrode active material. Further, the present invention is not particularly limited to the composition and the like of the non-aqueous electrolyte, namely, a kind or combination of the organic solvent, a kind or mixing amount of the lithium salt and the like.

INDUSTRIAL APPLICABILITY

Because the present invention provides a non-aqueous electrolyte battery capable of securing safety at a time of battery abnormality and restricting a drop in capacity or output at a time of battery use, the present invention contributes to manufacturing and marketing of a non-aqueous electrolyte battery. Accordingly, the present invention has industrial applicability.

What is claimed is:

1. A non-aqueous electrolyte battery comprising a positive electrode mixture including a positive electrode active material applied to a collector and a negative electrode plate comprising a negative electrode mixture including a negative electrode active material applied to a collector disposed via a porous separator, and a flame retardant layer containing a phosphazene compound as a flame retardant and a binder having ionic conductivity provided at one side or both sides of the positive electrode plate, wherein the flame retardant is contained at a percentage of 10 wt % or more and 20 wt % or less to the positive electrode mixture, the binder is a polyether-based polymer compound, and the flame retardant layer contains the flame retardant at a percentage ranging from 50 wt % to 91 wt % and the binder at a percentage ranging from 9 wt % to 50 wt %, respectively.

2. The non-aqueous electrolyte battery according to claim 1, wherein the flame retardant decomposes thermally under a thermal environment of from 60 deg. C. to 400 deg. C.

3. The non-aqueous electrolyte battery according to claim 2, wherein the polyether-based polymer compound includes a polyethylene oxide.

4. The non-aqueous electrolyte battery according to claim 2, further comprising a battery container in which the positive electrode mixture including a positive electrode active material applied to a collector and the negative electrode plate disposed via the porous separator, and the flame retardant layer are provided, and a non-aqueous electrolyte provided in the battery container.

5. The non-aqueous electrolyte battery according to claim 4, wherein the non-aqueous electrolyte comprises a lithium salt and a solvent.

6. The non-aqueous electrolyte battery according to claim 4, wherein the non-aqueous electrolyte comprises lithium hexafluorophosphate and a mixed solvent comprising ethylene carbonate, dimethyl carbonate and diethyl carbonate.

* * * * *